Patented Jan. 12, 1932

1,840,715

UNITED STATES PATENT OFFICE

STANLEY HILLER, OF BERKELEY, CALIFORNIA, ASSIGNOR TO STANLEY HILLER INCORPORATED, OF SAN FRANCISCO, CALIFORNIA, A CORPORATION

FISH OIL EXTRACTION

No Drawing.   Application filed February 24, 1930. Serial No. 431,062.

This invention relates to processes of extracting fats and oils from animal products such as fish, and constituents thereof such as cod livers, and like oil-bearing products, and the present application is a continuation in part of my copending applications Ser. No. 724,633, filed July 7, 1924, Ser. No. 603,343, filed November 25, 1922, and Ser. No. 113,343, filed June 2, 1926.

In recovering oil from oil-bearing substances of animal origin it is common practice so to treat the products that the moisture content thereof is reduced substantially below 20%, and preferably within the range of 5% to 10% of moisture, and thereafter to expel the oil from the solids by means of high pressure screw presses, such as are shown in United States Patents Nos. 836,701; 829,135 and 1,049,834 and in copending application Ser. No. 724,662. Also it is common practice to digest such oil-bearing substances with steam to break down the cellular structure and free the oils and fats from the solids, and then to express the liquids from the solids by the use of presses that subject the solids to relatively low pressures, the pressures being kept low in order that no substantial proportion of the solids is forced out of the press with the liquids, and in order that emulsification of the oils with water will be avoided so far as possible. In such an operation the pressures employed have not substantially exceeded 200 pounds per square inch; and the liquid effluent comprises water and free oil and the oil is recovered therefrom merely by settling. In such operations 13% or more of oil remains in the press cake.

In the recovery of oil from animal products in accordance with this invention, oil-bearing products of animal origin are so treated that the oils and fats and liquid constituents are released from the cellular structure of the products that tends to retain them, without regard to the nature of the mixture that results from such treatment. The treatment effects a destruction of the cellular structure of the products and in the freeing of the oils and the liquid content and in the formation of an emulsion of oil and water with finely divided solid particles suspended therein. The mixture resulting from this treatment comprises a substantial proportion, or consists wholly, of an emulsion containing a substantial proportion of finely divided solids which appear to be in colloidal suspension. The solid particles in the emulsion are so finely divided and the mixture is of such nature that a substantial proportion thereof, or substantially all of such particles will remain in suspension in the emulsion and settling will not sufficiently free the mixture of such particles. It is believed that the presence of such finely divided solids tends to stabilize the emulsion, as in practice it is found that after the removal of such particles the oil and water of the mixture will separate upon heating the emulsion freed of solids. In prior practice the formation of such a mixture was avoided so far as possible, but in the practice of this invention such prior practice precautions as preliminary removal of moisture and the limitation of pressure employed to pressures that would not introduce finely divided solids in substantial proportions into the liquid effluent, are not taken, and the resulting mixture contains more than 20% of water and is free flowing. In addition to the tendency of the finely divided solids to stabilize the emulsion and prevent recovery of oil from the liquid effluent by settling, the finely divided condition of the solids tends to cause some of the solid material to go into solution upon standing of the mixture, and that part of the solids is then only recoverable by evaporation.

Thus, a feature of this invention is that the removal of oil and liquids from the solids is substantially complete, but the liquid removed comprises a mixture that resists separation and recovery of the oil by settling and which, if allowed to stand, is of such nature as to facilitate a loss of some of the solids and a darkening and impairment of the oil. And, another feature of my invention is that the solids are removed from the mixture centrifugally and the separation and recovery of the oil is thereby facilitated, and the necessary period of standing of the solids and liquids in contact in minimized, and loss of solids by solution is substantially avoided.

In the practice of this invention the oil-bearing products of animal origin are so treated as to release the oils from the cellular structure, with the consequent formation of emulsion containing finely divided solid particles in suspension, and the separation and separate recovery of oil and water and solids from that mixture may be effected in part by gravity settling, but it is a feature of this invention that the separation of the emulsion containing finely divided solids involves at least one centrifugal treatment of sufficient intensity to remove the suspended solids.

In the practice of this invention the oil-bearing products of animal original, without reduction of moisture content thereof to or below 20%, and preferably without any reduction of moisture content, are preferably passed through a pulper or press of the type of those described in the patents and applications above identified, under high pressure and therein so ground, crushed, and squeezed that solids are forced out through the press screen openings in finely divided state and the liquid effluent consists of an emulsion of oil and water with finely divided solids suspended therein. The freeing of the oils may be facilitated by heating the oil-bearing products prior to the pulping or pressing operation, heat rendering the oils more fluid and assisting in breaking down the cells. The presence of excess water is not detrimental and will tend to wash out some of the freed oil. Some of the excess water and some of the oil may be separated from the liquid effluent by settling, but a considerable quantity of the oil remains in emulsion and discarding of such emulsion would entail a very substantial loss, and the entire mixture can be separated into a clear oil fraction and an aqueous fraction substantially free of oil, by separating operations carried out in accordance with this invention and including centrifugal treatment. In the practice of this invention proper heating and addition of water can be effected simultaneously by steaming of the oil-bearing products prior to pressing. The pressing operation will produce a free flowing emulsion and presence of excess water is not harmful.

In the preferred practice of this invention the entire liquid effluent, from the step in which the oils contained in oil-bearing animal products are freed with the consequent production of a free-flowing emulsion, is passed directly to centrifugal separating machines which are so operated that the solids are taken out of suspension and oil is freed of the remaining constitutents of the mixture and the remaining constituents of the mixture are freed of oil.

Preferably the recovery of the oil from the emulsified mixture is divided into two separating stages or operations. The first of such separating operations may be carried out in any well known type of centrifuge and preferably one in which the rotor has a large capacity for solids retained in the rotor; and the second of such separating operations is preferably carried out in a centrifuge rotating at high speed, such centrifuges ordinarily having a low capacity for solids retained in the rotor. In such treatment the first centrifuging removes a large proportion of the solid material from the emulsified mixture; and the liquid discharge from the first centrifuge is passed, with or without a heating operation hereinafter described, to the second, which is preferably of the high centrifugal force type, wherein the oil is separated from the remaining water and solids and is discharged in a state in which it is practically free of solids and water, the water being discharged in a state in which it is substantially free of solids and contains at most only a trace of oil. In such an operation but little time, usually less than fifteen minutes, expires between the time at which the mixtures leave the press and the time at which the oil reaches the storage tanks, whereas various periods from one to four hours were required in the methods of the prior art wherein a limited quantity of oil was recovered by settling. The oil, particularly when it contains suspended solids, deteriorates rapidly on standing, and the rapid handling that is possible in this centrifugal treatment minimizes such deterioration and enables the production of oil of uniformly high quality.

As above stated, it is sometimes desirable to heat the emulsion being treated, between the preliminary separating treatment and the final centrifuging operation; and in connection with such heating particular attention should be paid to the suggestion above made that operation of the process be carried on rapidly in order to avoid deterioration, because experience has shown that when the material fed to the final centrifuging step is preliminarily heated a failure to effect the final centrifuging promptly will frequently result in discoloration of the oil.

In the practice of this invention some separation can be effected by gravity settling, and one of the two separating operations above referred to can be carried out by gravity settling, so long as the separating operations as a whole include centrifugal treatment that will take the solids out of suspension and facilitate the breaking of the emulsion. Some conidtions encountered in the practice of this invention are particularly adapted to the use of gravity settling to effect some of the separation. Thus when the treatment of the oil-bearing products involves a cooking step that is performed in such a way as to add water, and particularly when the products are of high oil content, excess water and free oil may be separated by gravity without great difficulty. In any part of the separation that is effected by gravity, water accumulates at the bottom of the settling tank and oil rises to the top and an intermediate emulsion layer forms. The oil is drawn off and stored either with or without centrifugal clarification, and the water may be drained away, with or without centrifugal recovery of solids therein, and the intermediate layer is centrifugally treated, preferably in a heated condition. Any settling employed in the practice of this invention must be carefully controlled to avoid extensive dissolving of valuable solids in the water and consequent loss thereof and to avoid deterioration of the oil and solids. While it is possible to effect part of the separating operation by gravity settling in the pratice of this invention, such separation must be carefully controlled to avoid such injury, and the best practice of this invention involves the bringing of the major proportion of the oil into an emulsified condition and the effecting of the major portion or all of the separating by centrifuging.

As another modification of the separating operations involved in the practice of this invention, a centrifuge may be employed that is so constructed and operated that the oil on the one hand and the remaining liquids of the emulsion on the other hand are separately discharged and the solids are retained in the rotor.

This invention is valuable in the treatment of fish products high in oil, such as cod livers, herring, menhadden, salmon, sardines, pilchards, and like oil-bearing fish and fish waste products. In the treatment of fish products such as the fish above mentioned, and the like, or oil-bearing waste therefrom, the natural moisture content is usually found to be 60% or higher and to be ample to form the free flowing emulsion of the oils and solids that is produced in the treatment of oil-bearing products in accordance with this invention. Such fish products contain approximately 10% to 20% of oil, approximately 20% of solids, and the remainder is water. In treating such products they are preferably sterilized to soften the bone and partially break down the cellular oil-bearing structures, by cooking prior to the formation of the emulsion, such cooking being effected by live steam or by steam under pressure developed from the natural moisture of the products while preventing escape of moisture during the heating. The use of live steam adds water to the resulting mixture. The material is passed through a high pressure press and the high pressures and grinding action produce a free flowing emulsion as an effluent passing through the openings of the press screen, which consists of oil and water and contains finely divided solids in suspension. The bone, skin and non-oil-bearing products coming from the press in the form of a cake may be manufactured into a meal and they are substantially free of oil. The liquid effluent passing to the separating operations, will be at a temperature between approximately 140° F. and 160° F. if the products were cooked by steam under pressure prior to pulping. The liquid effluent from the press consists of an emulsion of the oil and water and contains finely divided solids in suspension and is incapable of being effectively separated by gravity and preferably the major portion will resist gravity separation; and the recovery therefrom of the oil, free from water and solids can be effected wholly by centrifugal separation or partly by gravity and partly by centrifugal separation as above set out.

Cod livers contain 20% to 60% of oil, approximately 60% to 30% of water and the remainder consists of solids or semi-solids. A free flowing emulsion is readily produced from cod livers in the practice of this invention without the addition of water, but water in excess of that necessary to form a free flowing emulsion may be added by cooking or steaming to free the oil prior to the emulsifying without departing from this invention. Cod livers may be treated in accordance with this invention without heating and if heat is employed the temperature should be kept below 85° C. to avoid destruction of vitamins and impairment of the medicinal qualities of the oil. An emulsion may be produced from cod livers by passing them through a press of the type above referred to or by means of a tomato pulper in which materials are forced outward through fine screen openings, or the livers may be merely ground or macerated in suitable equipment such as a meat grinder. In any event a pulpy mass comprising an emulsion of oil and water and containing finely divided solids in suspension will be produced and such emulsion is treated for the separate recovery of oil and solids in the manner above described.

From the foregoing it will be apparent that in the practice of this invention a maximum proportion of oil is released or set free from cells of the oil-bearing products of animal origin in spite of the fact that this results in the formation of a mixture from which oil could not be recovered effectively heretofore, and from such a mixture substantially all of the oil is recovered in a pure state in which it is free from solids, and the solids are recovered in a state in which they are free of oil; and the solids resulting from the formation of the emulsified mixture are substantially free of oil, and all recovered solids are available for valuable uses. It will be understood that the foregoing specific examples are illustrative only and not restrictive, that the temperatures stated may be varied, that the use of water in excess of that necessary to form a free flowing emulsion and in excess of that contained in the materials treated is not objectionable, and that the invention is not limited with respect to the proportions used so long as sufficient water is present to cause the emulsified suspension of solids to be free flowing.

In the appended claims the term "by mechanical disintegration" is intended to exclude a disintegration of material solely by a heating operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a process for extracting oils from oil-bearing products of animal origin, the steps comprising forming by mechanical disintegration from the oil-bearing products containing a substantial proportion of water an emulsion that contains oil of the products and water and contains solids of the products in finely divided condition and in suspension, and subjecting the resulting emulsion and finely divided solids to treatment for the recovery of oil therefrom that includes centrifugal treatment for the separation of oil from water and said finely divided solids.

2. In a process for extracting oils from oil-bearing products of animal origin, the steps comprising forming by mechanical disintegration from the products a free flowing emulsion comprising the oil of the products and water and having finely divided particles of the solids of the products suspended therein, and subjecting the free flowing emulsion to centrifugal force and separating the oil from the water and solids.

3. In a process for extracting oils from oil-bearing products of animal origin, the steps comprising forming by mechanical disintegration from the products a free flowing emulsion comprising the oil and water and having finely divided particles of the solids of the products suspended therein, subjecting the free flowing mass to an intermediate separating operation dependent upon differences of the specific gravity of the constituents, and subjecting the emulsion resulting from said intermediate separating operation to high centrifugal force to separate the oil therefrom.

4. In a process for extracting oils from oil-bearing products of animal origin, the steps comprising forming by mechanical disintegration from the products a free flowing emulsion comprising the oil and water and having finely divided particles of the solids of the products suspended therein, subjecting the free flowing emulsion to separate separating operations dependent upon differences of specific gravity and one of which involves the subjecting of the material to high centrifugal force, and thereby recovering the oil substantially free of water and solids from the emulsion.

5. In a process for extracting oil from oil-bearing fish products containing substantial quantities of water, which comprises forming by mechanical disintegration from the oil-bearing products an emulsion that contains oil of the products and water and contains solids of the products in finely divided condition and in suspension, subjecting the resulting emulsion to an intermediate separating operation dependent upon differences in specific gravity of the constituents, heating the emulsified residue, and centrifuging the heated residue in a centrifuge of the high centrifugal force type.

6. In a process for extracting oils from oil-bearing products of animal origin, the steps comprising pressing the products to produce an effluent mass composing an emulsion containing the oils, heating resulting oil-bearing emulsion rapidly, and centrifuging the heated material promptly and thereby recovering the oil substantially free of solids and water prior to discoloration of the oil due to the heating operation.

7. The process of extracting oils from oil-bearing fish materials which comprises the steps of forcing the materials through perforations sufficiently fine to form an effluent mass comprising an emulsion of the oils contained therein and water and finely divided solids, and centrifuging the effluent mass to separate the solid content from the liquid content and the oil from the water.

8. In a process of extracting oils from cod livers the steps comprising, by mechanical disintegration, forming from the livers a mass comprising an emulsion of the oils contained therein and water and containing finely divided solids thereof and water, and centrifuging the effluent mass to separate the solid content from the liquid content and the oil from the water.

9. The process of extracting oil from oil-bearing fish products embodying substantial quantities of moisture, which comprises expressing the materials to be treated while hot in a press to form an effluent mass comprising an emulsion of fish oil and water and containing finely divided suspended solids; separating heavy constituents from the effluent by an intermediate operation dependent upon the difference in specific gravity of the constituents, heating the emulsion containing residue, and centrifuging the heated residue at high speed to separate the oils before substantial discoloration of the oil due to said heating occurs.

In testimony whereof I affix my signature.

STANLEY HILLER.